United States Patent
Rajput (10) Patent No.: US 12,522,186 B2
(45) Date of Patent: Jan. 13, 2026

(54) SMOOTH AUTOMATED BRAKING AT LOW SPEED

(71) Applicant: Atieva, Inc., Newark, CA (US)

(72) Inventor: Priya Rajput, Santa Clara, CA (US)

(73) Assignee: Atieva, Inc., Newark, CA (US)

(*) Notice: Subject to any disclaimer, the term of this patent is extended or adjusted under 35 U.S.C. 154(b) by 0 days.

(21) Appl. No.: 18/698,200

(22) PCT Filed: Sep. 29, 2022

(86) PCT No.: PCT/US2022/077289
§ 371 (c)(1),
(2) Date: Apr. 3, 2024

(87) PCT Pub. No.: WO2023/060011
PCT Pub. Date: Apr. 13, 2023

(65) Prior Publication Data
US 2025/0236272 A1    Jul. 24, 2025

Related U.S. Application Data

(60) Provisional application No. 63/262,071, filed on Oct. 4, 2021.

(51) Int. Cl.
*B60T 7/22* (2006.01)
*B60T 8/172* (2006.01)
*B60W 30/095* (2012.01)

(52) U.S. Cl.
CPC ............. *B60T 7/22* (2013.01); *B60T 8/172* (2013.01); *B60W 30/095* (2013.01); *B60T 2201/022* (2013.01); *B60T 2230/04* (2013.01)

(58) Field of Classification Search
CPC ...... B60T 7/22; B60T 8/172; B60T 2201/022; B60T 2230/04; B60T 2201/10;
(Continued)

(56) References Cited

U.S. PATENT DOCUMENTS 3,828,236 A    8/1974   Close
7,208,901 B2   4/2007   Ladra et al.
(Continued)

FOREIGN PATENT DOCUMENTS

WO    2009055120 A2    4/2009

OTHER PUBLICATIONS

International Search Report and Written Opinion for PCT Application No. PCT/US2022/077289, mailed on Dec. 15, 2022, 7 pages.
(Continued)

*Primary Examiner* — Sizo B Vilakazi
(74) *Attorney, Agent, or Firm* — Brake Hughes Bellermann LLP (57) ABSTRACT

Braking of a vehicle at low speed comprises: dynamically determining, while a vehicle is controlled by a driver, a deceleration limit for the vehicle with regard to an obstacle, the deceleration limit determined based on at least (i) the low speed, (ii) a distance to the obstacle, and (iii) a determined jerk limit for the vehicle; after dynamically determining the deceleration limit, determining regions to include in a braking profile for the vehicle; when the regions determined do not include a constant deceleration region, again determining the deceleration limit, wherein the deceleration limit is not again determined when the regions determined do include the constant deceleration region; determining whether to brake the vehicle, the determination based on at least the low speed, the deceleration limit, and the distance to the obstacle; and in response to a determination to brake the vehicle, braking the vehicle according to the braking profile.

14 Claims, 5 Drawing Sheets

(58) Field of Classification Search
CPC ............. B60W 30/095; B60W 30/182; B60W 2720/106; B60W 2554/802
See application file for complete search history.

(56) References Cited

U.S. PATENT DOCUMENTS

| | | | |
|---|---|---|---|
| 9,789,858 B1* | 10/2017 | Parikh | ........................ B60T 7/22 |
| 2002/0074964 A1 | 6/2002 | Quaschner et al. | |
| 2003/0074123 A1 | 4/2003 | Kin et al. | |
| 2012/0296498 A1 | 11/2012 | Essadouni et al. | |
| 2014/0277990 A1 | 9/2014 | Zambou | |
| 2014/0336894 A1 | 11/2014 | Kikuchi et al. | |
| 2019/0168722 A1* | 6/2019 | Schroeder | ................. B60T 7/22 |
| 2019/0250622 A1 | 8/2019 | Nister et al. | |
| 2020/0047745 A1* | 2/2020 | Suzuki | ................... G06V 20/59 |
| 2020/0055499 A1 | 2/2020 | Das et al. | |
| 2020/0130662 A1* | 4/2020 | Buerkle | ................ B60W 30/09 |
| 2021/0171038 A1* | 6/2021 | Lee | ................. B60W 30/18109 |

OTHER PUBLICATIONS

Extended European Search Report for European Application No. 22879399.8, mailed Jul. 28, 2025, 11 pages.,.

* cited by examiner

SMOOTH AUTOMATED BRAKING AT LOW SPEED

CROSS-REFERENCE TO RELATED APPLICATION

This application is a 35 U.S.C. § 371 National Phase Entry Application from PCT Application No. PCT/US2022/077289, filed on Sep. 29, 2022, entitled "SMOOTH AUTOMATED BRAKING AT LOW SPEED", and designating the U.S., which claims priority to U.S. Patent Application No. 63/262,071, filed on Oct. 4, 2021, and entitled "SMOOTH AUTOMATED BRAKING AT LOW SPEED," the disclosures of which are incorporated by reference herein in its their entireties.

TECHNICAL FIELD

This document relates to smooth automated braking of a vehicle at low speed.

BACKGROUND

Approaches have been made at assisting the driver of a vehicle in performing a task, such as controlling the acceleration or deceleration of the vehicle. Some approaches involve guiding the vehicle in a lane change. However, such features may be mainly focused on achieving a particular target velocity in order to make a smooth lane change. Other approaches that involve guiding the vehicle at low speed may not have achieved smooth vehicle motion.

SUMMARY

In a first aspect, a computer-based method of providing braking of a vehicle at low speed comprises: dynamically determining, while a vehicle controlled by a driver is traveling at low speed, a deceleration limit for the vehicle with regard to an obstacle, the deceleration limit determined based on at least (i) the low speed, (ii) a distance to the obstacle, and (iii) a determined jerk limit for the vehicle; after dynamically determining the deceleration limit, determining regions to include in a braking profile for the vehicle; when the regions determined do not include a constant deceleration region, again determining the deceleration limit, wherein the deceleration limit is not again determined when the regions determined do include the constant deceleration region; determining whether to brake the vehicle, the determination based on at least the low speed, the deceleration limit, and the distance to the obstacle; and in response to a determination to brake the vehicle, braking the vehicle according to the braking profile.

Implementations can include any or all of the following features. The deceleration limit comprises a minimum deceleration applicable to the vehicle. Determining the regions to include in the braking profile comprises determining whether to use a triangular braking profile. Determining whether to use the triangular braking profile comprises choosing between the triangular braking profile and a trapezoidal braking profile. Multiple braking profiles are determined for the vehicle, further comprising performing a choice among the braking profiles before braking the vehicle according to the braking profile. The choice comprises taking into account respective stopping distances of the multiple braking profiles. The computer-based method further comprises, in response to a determination not to brake the vehicle, again dynamically determining the deceleration limit. Again dynamically determining the deceleration limit is based on at least a change in the low speed. The computer-based method further comprises, in response to the determination to brake the vehicle, storing the deceleration limit in a memory and terminating dynamic determination of the deceleration limit. The computer-based method further comprises receiving, before dynamically determining the deceleration limit, a user's choice among engagement levels, wherein the jerk limit for the vehicle depends on the engagement level of the user's choice. The computer-based method further comprises determining, for each of the regions of the braking profile, a time interval corresponding to application of braking according to the region of the braking profile. The computer-based method further comprises using the determined time intervals in determining a stopping distance for the vehicle. The obstacle is detected using at least an ultrasonic sensor.

In a second aspect, a non-transitory computer-readable medium includes instructions that when executed cause a processor to perform operations, the operations comprising: dynamically determining, while a vehicle controlled by a driver is traveling at low speed, a deceleration limit for the vehicle with regard to an obstacle, the deceleration limit determined based on at least (i) the low speed, (ii) a distance to the obstacle, and (iii) a determined jerk limit for the vehicle; after dynamically determining the deceleration limit, determining regions to include in a braking profile for the vehicle; when the regions determined do not include a constant deceleration region, again determining the deceleration limit, wherein the deceleration limit is not again determined when the regions determined do include the constant deceleration region; determining whether to brake the vehicle, the determination based on at least the low speed, the deceleration limit, and the distance to the obstacle; and in response to a determination to brake the vehicle, braking the vehicle according to the braking profile.

BRIEF DESCRIPTION OF DRAWINGS

Like reference symbols in the various drawings indicate like elements.

DETAILED DESCRIPTION

This document describes examples of systems and techniques providing smooth automated braking of a vehicle at low speed. In some implementations, subject matter described herein calculates acceleration limits dynamically to estimate a braking distance and to avoid retuning acceleration limits. In some implementations, subject matter described herein provides a jerk optimal low speed braking profile and improves safety in the event of failure. The smoothness can be provided at least partly by way of not retuning deceleration limits for the vehicle when the system takes control of the vehicle from the driver. A system can include the following components: A module or component that receives obstacle information detected by the sensor or another software component; A dynamically calibrated deceleration limit block; A module that determines the number of braking profile regions required to estimate the approximate braking distance; A braking engagement decision module/component; and A braking profile module or component.

As a first example, an algorithm can help decide whether a constant deceleration region should be included for calculating the brake distance to the obstacle. The braking profile can be a function of at least ego velocity and a distance at which the obstacle is detected. These two factors can be taken into account in determining whether the braking profile should be governed by a trapezoidal deceleration profile (e.g., decreasing, constant and increasing), or a triangular deceleration profile (decreasing and increasing). A controlled switch between the two profiles that prevents abrupt changes in the acceleration profile can be provided. This can help in smoothening the motion of the vehicle. In some implementations, triangular profiles can be advantageous when the obstacle is relatively close. For example, a triangular motion profile can then help in achieving quick motion movements.

In some implementations, the algorithm aims to calculate the time intervals of each region based on the dynamically calculated acceleration limits that get adjusted according to different braking engagement levels selected by the driver. As such, the system 100 can determine, for each region of the braking profile, a time interval corresponding to application of braking according to that region of the braking profile. After deciding whether a triangular or a trapezoidal profile is appropriate, for example, the algorithm decides whether an adjustment is needed for the deceleration limits in each region. The algorithm can ensure that it is not reaching the deceleration limits in each case. For example, this can facilitate controlling the jerk or snap that the driver would experience.

As a first example, an algorithm can estimate optimal jerk-based speed profiles considering the braking that the driver would be comfortable with. In some implementations, the algorithm can continue to estimate the appropriate brake distance in the event of target being lost due to sensor failures or missed object detections. Such an assumption can hold for static objects because in the event of target being lost the system would still know that the velocity of the object is zero in this case.

In some implementations, a braking profile is distinctively determined by multiple (e.g., two or three regions) of braking. A comparison of the stop distance and estimated brake distance can be done with respect to the deceleration profile. An appropriate braking profile can then be chosen.

Examples described herein refer to a vehicle. As used herein, a vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. A vehicle can be powered exclusively by electricity, or can use one or more other energy sources in addition to electricity, to name just a few examples. The vehicle controlled by a system or technique as described herein is sometimes referred to as an "ego vehicle."

Examples described herein refer to a vehicle traveling at low speed. As used herein, low speed does not exceed a velocity of about ten kilometers per hour. Driving at low speed can occur during a parking maneuver, in stop-and-go traffic, and/or in other situations.

Examples described herein refer to acceleration and/or deceleration. Acceleration refers to a rate of change in speed. Acceleration can be specified using both positive and negative values. Negative acceleration is sometimes referred to as deceleration. For example, a negative amount of acceleration of a vehicle can correspond to a positive amount of deceleration of the vehicle, and vice versa. As such, examples herein that mention acceleration relate to either positive acceleration, or deceleration, or both. Jerk is a rate of change of acceleration.

Examples herein refer to assisted driving or autonomous driving. For example, an advanced driving-assistance system (ADAS) can be used. Assisted driving involves at least partially automating one or more dynamic driving tasks. An ADAS can perform assisted driving and is an example of an assisted-driving system. Assisted driving is performed based in part on the output of one or more sensors typically positioned on, under, or within the vehicle. A system can plan one or more trajectories for a vehicle before and/or while controlling the motion of the vehicle. A planned trajectory can define a path for the vehicle's travel. As such, propelling the vehicle according to the planned trajectory can correspond to controlling one or more aspects of the vehicle's operational behavior, such as, but not limited to, the vehicle's steering angle, gear (e.g., forward or reverse), speed, acceleration, and/or braking.

While an autonomous vehicle is an example of a system that performs assisted driving, not every assisted-driving system is designed to provide a fully autonomous vehicle. Several levels of driving automation have been defined by SAE International, usually referred to as Levels 0, 1, 2, 3, 4, and 5, respectively. For example, a Level 0 system or driving mode may involve no sustained vehicle control by the system. For example, a Level 1 system or driving mode may include adaptive cruise control, emergency brake assist, automatic emergency brake assist, lane-keeping, and/or lane centering. For example, a Level 2 system or driving mode may include highway assist, autonomous obstacle avoidance, and/or autonomous parking. For example, a Level 3 or 4 system or driving mode may include progressively increased control of the vehicle by the assisted-driving system. For example, a Level 5 system or driving mode may require no human intervention of the assisted-driving system.

Figure 1:
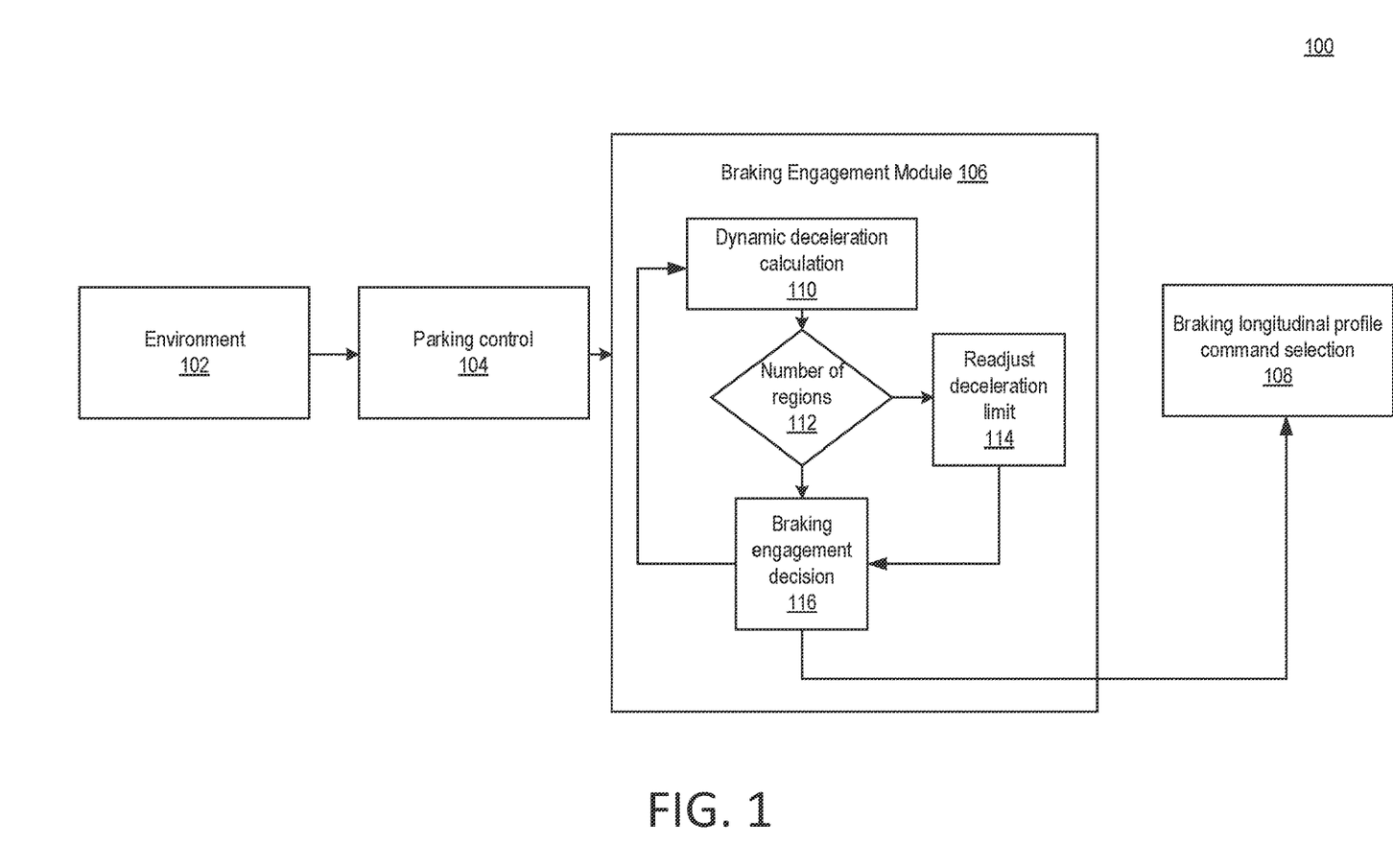
FIG. 1 shows an example of a system that can be used for providing smooth automated braking of a vehicle at low speed.

FIG. 1 shows an example of a system 100 that can be used for providing smooth automated braking of a vehicle at low speed. The system 100 can be used with one or more other examples described elsewhere herein. The system 100 can be implemented using one or more components described with reference to FIG. 4. For example, modules described herein can be implemented using at least some components described with reference to FIG. 5 (e.g., a processor executing instructions stored in a memory), In some implementations, the system 100 can control the motion of a vehicle as it undergoes low-speed motion. For example, this can involve a parking event during which the system 100 detects an obstacle. Examples of obstacle detection are described below. The system 100 can generate a smooth braking motion for the parking maneuver. Other approaches can be used. For these and/or other purposes, the system 100 can include an environment module 102, a parking control module 104, a braking engagement module 106, and a braking longitudinal profile command selection module 108.

The environment module 102 can include one or more sensors to generate output(s) based on the environment or other surroundings of the vehicle. In some implementations, the sensor(s) can be included in, mounted to, or otherwise associated with the vehicle whose motion is to be controlled. Examples of sensors are described below.

The parking control module 104 receives information that the environment module 102 generates in response to environment detection. The system 100 can detect an obstacle relative to the vehicle. For example, this detection can be done while the vehicle is controlled by a driver and is traveling at low speed.

In some implementations, the parking control module 104 monitors comfort braking engagement states and decides the appropriate states based on the feedback from a longitudinal controller of the vehicle. A driver of the vehicle can have the option to turn on the comfort braking. By default, the braking engagement state may enter a monitoring state. In the monitor state, the parking control unit can monitor the environment during a low-speed maneuver (e.g., parallel parking or perpendicular parking). In the event of obstacle detection, the parking control module 104 can provide information regarding a stop distance to the obstacle.

The parking control module 104 can provide multiple engagement levels for the operation of the system 100. In some implementations, the driver can choose which of the engagement levels the system 100 should apply. The engagement levels can include, but are not limited to, a high acceleration and/or jerk level, a medium acceleration and/or jerk level, and a low acceleration and/or jerk level. For example, the high engagement level can involve the system 100 applying relatively more acceleration. As another example, the low engagement level can involve the system 100 applying relatively less acceleration. The parking control module 104 can receive a user's choice among the engagement levels and apply that choice to set or change one or more operation aspects of the system 100.

The braking engagement module 106 can evaluate whether the system 100 should assist the driver in controlling the motion of the vehicle, and if so, determine one or more characteristics of such assistance. The braking engagement module 106 is here exemplified by way of flowchart boxes indicating possible sequences of operation. These operations will be referred to as components of the braking engagement module 106 to indicate that an operation can be performed by one or more components, or that a component can be responsible for the performance of one or more operations.

The braking engagement module 106 includes a dynamic deceleration calculation component 110. Based on an engagement state feedback (e.g., current brake engagement feedback) and a stop distance (e.g., the distance to the object according to the parking control module 104), the dynamic deceleration calculation component 110 can calculate one or more deceleration limits for the vehicle. As such, the dynamic deceleration calculation component 110 can dynamically determine the deceleration limit(s) for the vehicle. The deceleration limit may not be applied immediately to control the motion of the vehicle; rather, once the braking is triggered the deceleration limit can be stored in a register.

The braking engagement module 106 includes a decision component 112. The decision component 112 can determine regions to include in a braking profile for the vehicle. As such, the decision component 112 can select the braking profile that is to be used. In some implementations, a trapezoidal or triangular deceleration profile can be selected by the decision component 112. Each of such braking profiles can include a number of regions. Examples of braking profiles are described below. The choice of a type of braking profile can be made after performing a calculation of time intervals in each region and a decision is made regarding a deceleration region.

In one outcome of operating the decision component 112, the decision is to use a braking profile with a particular number of regions. In some implementations, the decision corresponds to not including a constant deceleration region (e.g., when the braking profile includes two regions). For example, this can correspond to a triangular braking profile. As such, determining the regions to include in the braking profile can include determining whether to use a triangular braking profile. The braking engagement module 106 includes a readjust deceleration limit component 114 that can again determine the deceleration limit(s). For example, this can be considered readjusting the deceleration limit(s).

In another outcome of operating the decision component 112, the decision is to use a braking profile with a different particular number of regions. In some implementations, the decision corresponds to including the constant deceleration region (e.g., when the braking profile includes three regions). For example, this can correspond to a trapezoidal braking profile. As such, determining the regions to include in the braking profile can involve choosing between at least a triangular braking profile and a trapezoidal braking profile. In such outcomes that include the constant deceleration region, the readjust deceleration limit component 114 can be bypassed. For example, the deceleration limit(s) may then not be readjusted or retuned.

The braking engagement module 106 includes a braking engagement decision component 116. The braking engagement decision component 116 can be invoked either after readjusting the deceleration limit(s) using the readjust deceleration limit component 114, or when the decision at the decision component 112 is to use a braking profile with the different particular number of regions that include the constant deceleration region. The braking engagement decision component 116 decides whether the system 100 should engage or not (e.g., whether to assist, or take over control from, the driver) based on several factors. For example, such factors can include current ego speed and error states of sensor hardware.

When the braking engagement decision component 116 decides that the system 100 should not engage, the braking engagement module 106 can again invoke the dynamic deceleration calculation component 110 (as indicated by an arrow from the braking engagement module 106 to the dynamic deceleration calculation component 110). This calculation is dynamic, meaning that it may calculate a different deceleration limit than previously. For example, this can be due to a change in the speed of the vehicle.

When the braking engagement decision component 116 decides that the system 100 should engage, one or more operations can ensue. In some implementations, the deceleration limit(s) that have presently been determined (either by way of the dynamic deceleration calculation component 110, or as again determined by the readjust deceleration limit component 114), the corresponding value(s) can be stored by the system 100. For example, the value(s) can be stored in a register or other form of memory. In some implementations, dynamic determination of the deceleration limit can be terminated based on deciding to engage brakes. As such, the system 100 may not again invoke the dynamic deceleration calculation component 110 as indicated by the arrow mentioned above. In some implementations, the braking engagement decision component 116 can cause the braking engagement module 106 to send the appropriate decision to the braking longitudinal profile command selection module 108.

The braking longitudinal profile command selection module 108 can perform a comparison of stop distance from the parking control module 104 with the braking distances associated with braking profiles having different regions. This can be done to select the appropriate jerk limit vector for generating the profile commands. The choice can include taking into account a comparison of stopping distances received from the parking control module 104 with respective different braking region distances. An alternative approach could include determining the braking profile based on the time interval reference of the deceleration profile instead of distance reference.

Figure 2:
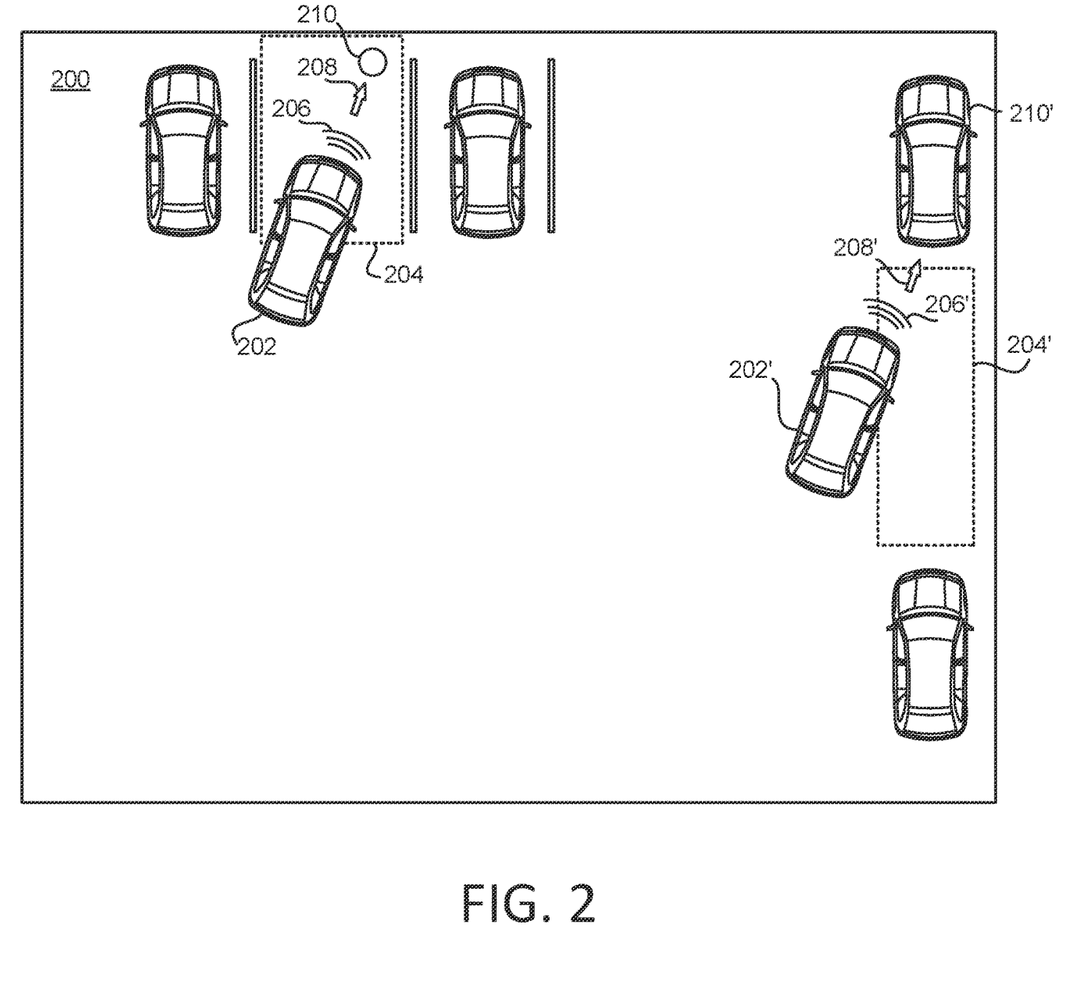
FIG. 2 shows examples of obstacle detection.

FIG. 2 shows examples of obstacle detection. The described examples can be used with one or more other examples described elsewhere herein. The examples will be described with reference to a parking lot 200, which can have one or more entrances or exits (not shown) for vehicles. Parking spots in the parking lot 200 can be arranged in one or more rows. Some parking spots can involve perpendicular parking and some can involve parallel parking.

Here, a vehicle 202 is currently entering a parking spot 204 for perpendicular parking. The vehicle 202 is currently controlled by a person who is the driver. The vehicle 202 is currently moving at low speed. One or more levels of assisted driving can be available with the vehicle 202. For example, the system 100 (FIG. 1) can offer two or more engagement levels for the driver to choose between. Before taking over from the driver, the system can monitor the surroundings of the vehicle 202 using at least one sensor. The use of the sensor is here schematically illustrated by way of a signal 206 near the vehicle 202, although the sensor does not necessarily generate any radiation or other emission to probe the surroundings. The vehicle 202 is traveling within or into the parking spot 204, as schematically indicated by an arrow 208. An obstacle 210 can be detected using the sensor(s). For example, the obstacle 210 can be a static or dynamic object. Depending on the selected engagement level, the ego speed of the vehicle 202, and the distance to the obstacle 210, the system can perform one or more determinations, calculations, and/or decisions (e.g., as exemplified above with reference to FIG. 1). For example, the outcome thereof can result in deciding to automatically apply brakes according to a selected braking profile.

A similar example can involve parallel parking. A vehicle 202' is currently entering a parking spot 204' for parallel parking. The vehicle 202' is currently controlled by a person who is the driver. The vehicle 202' is currently moving at low speed. One or more levels of assisted driving can be available with the vehicle 202'. For example, the system 100 (FIG. 1) can offer two or more engagement levels for the driver to choose between. Before taking over from the driver, the system can monitor the surroundings of the vehicle 202' using at least one sensor. The use of the sensor is here schematically illustrated by way of a signal 206' near the vehicle 202', although the sensor does not necessarily generate any radiation or other emission to probe the surroundings. The vehicle 20'2 is traveling within or into the parking spot 204', as schematically indicated by an arrow 208'. An obstacle 210' can be detected using the sensor(s). For example, the obstacle 210' can be a static or dynamic object. Here, the obstacle 210' is another vehicle. Depending on the selected engagement level, the ego speed of the vehicle 202', and the distance to the obstacle 210', the system can perform one or more determinations, calculations, and/or decisions (e.g., as exemplified above with reference to FIG. 1). For example, the outcome thereof can result in deciding to automatically apply brakes according to a selected braking profile.

Figure 3A:
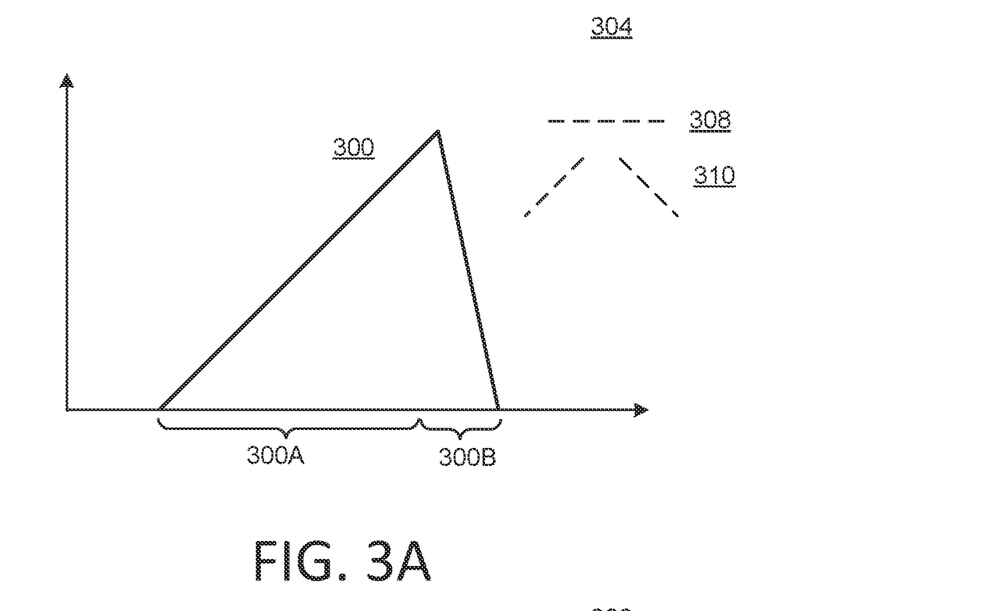
FIGS. 3A-3B show examples of braking profiles.
Figure 3B:
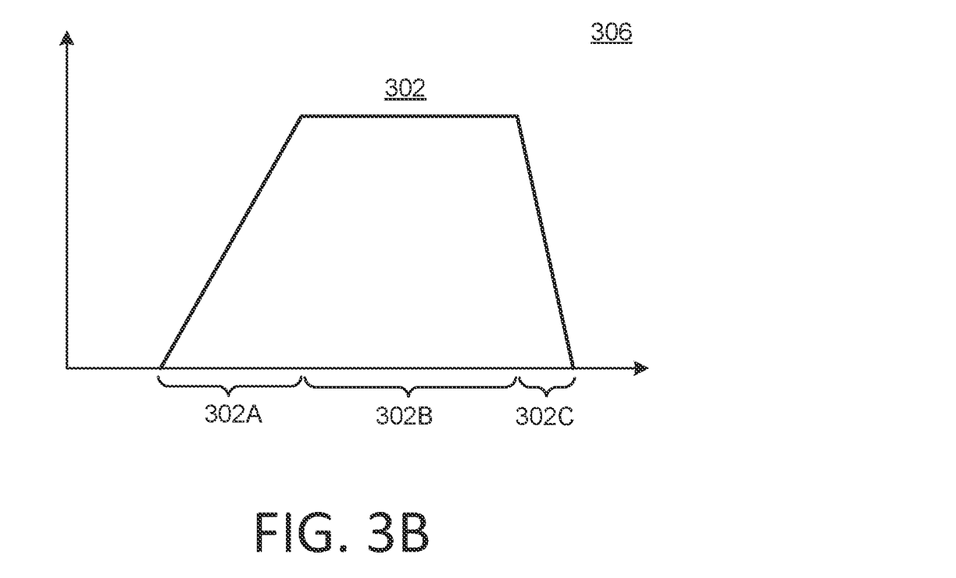

FIGS. 3A-3B show examples of braking profiles 300 and 302. The braking profiles 300 and 302 can be used with one or more other examples described elsewhere herein. A graph 304 presents the braking profile 300 using a vertical axis that corresponds to acceleration and a horizontal axis that corresponds to time. The braking profile 300 can include multiple regions. Here, regions 300A-300B are shown. In some implementations, the region 300A can be characterized as involving increasing deceleration. For example, the region 300A has negative jerk. In some implementations, the region 300B can be characterized as involving decreasing deceleration. For example, the region 300B has positive jerk. The braking profile 300 is an example of a triangular braking profile. For example, the cumulative duration of the respective time intervals of the regions 300A-300B can reflect the time it takes to stop a vehicle using the braking profile 300.

A graph 306 presents the braking profile 302 using a vertical axis that corresponds to acceleration and a horizontal axis that corresponds to time. The braking profile 302 can include multiple regions. Here, regions 302A-302C are shown. In some implementations, the region 302A can be characterized as involving increasing deceleration. For example, the region 302A has negative jerk. In some implementations, the region 302B can be characterized as involving constant deceleration. For example, the region 302B has zero jerk. In some implementations, the region 302C can be characterized as involving decreasing deceleration. For example, the region 302C has positive jerk. The braking profile 302 is an example of a trapezoidal braking profile. For example, the cumulative duration of the respective time intervals of the regions 302A-302C can reflect the time it takes to stop a vehicle using the braking profile 302.

One or more limits relating to acceleration can be applied. In some implementations, the braking profiles 300 and/or 302 can be associated with one or more of a deceleration limit 308 and/or a jerk limit 310. The deceleration limit 308 can represent the maximum or minimum deceleration value that the graph 306 can achieve. Here, the deceleration limit 308 is schematically represented as a horizontal dashed line; accordingly, each of the deceleration limits 308 can reflect a value of acceleration with reference to the vertical axis. The deceleration limit 308 can be dynamically determined based on ego speed, an obstacle distance to the, and a jerk limit for the vehicle. For example, the deceleration limit can reflect a limit beyond which the actuators would saturate. As another example, the deceleration limit can reflect a limit that is in accordance with the comfort of the driver. The jerk limit 310 can represent the maximum or minimum value for the rate of acceleration change that the graph 306 can achieve. Here, the jerk limit 310 is schematically represented by dashed lines sloping upward or downward. Accordingly, each of the jerk limits 310 can reflect a value of acceleration rate of change with reference to the vertical axis. In some implementations, a jerk limit can be defined based on a user-selected engagement level. The deceleration limit 308 and jerk limit 310 are shown for illustrative purposes only.

Figure 4:
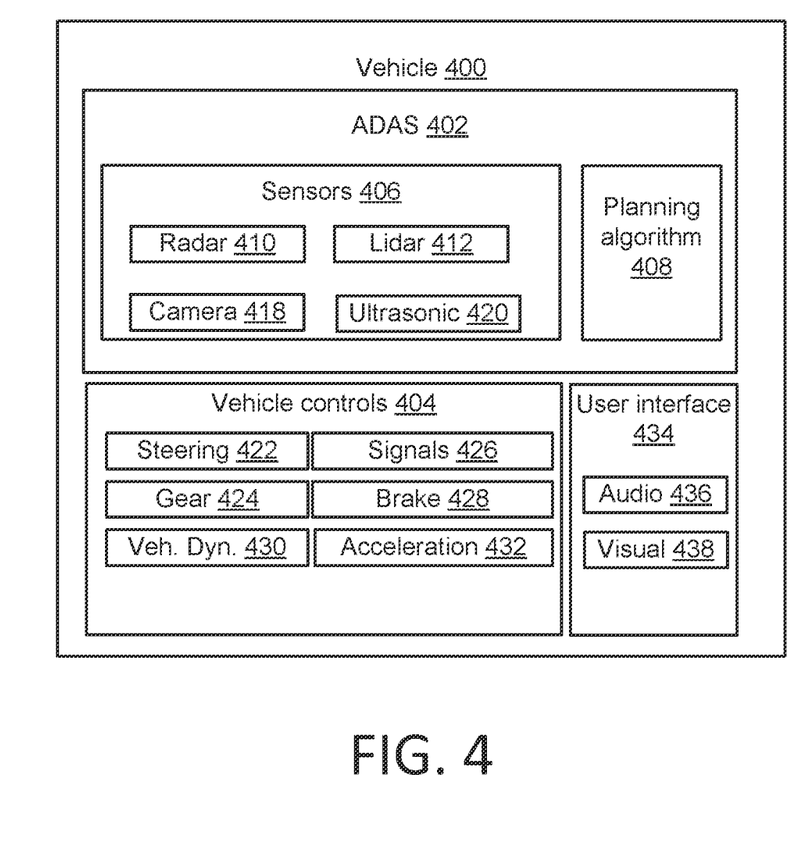
FIG. 4 shows an example of a vehicle.

FIG. 4 shows an example of a vehicle 400. The vehicle 400 can be used with one or more other examples described elsewhere herein. The vehicle 400 includes an ADAS system 402 and vehicle controls 404. The ADAS system 402 can be implemented using some or all components described with reference to FIG. 5 below. The ADAS system 402 includes sensors 406 and a planning algorithm 408. Other aspects that the vehicle 400 may include are omitted here for simplicity. This includes, but is not limited to, other components of the vehicle 400 where the ADAS system 402 may be implemented.

The sensors 406 are here described as also including appropriate circuitry and/or executable programming for processing sensor output and performing a detection based on the processing. The sensors 406 can include a radar 410. In some implementations, the radar 410 can include any object detection system that is based at least in part on radio waves. For example, the radar 410 can be oriented in a forward direction relative to the vehicle and can be used for detecting at least a distance to one or more other objects (e.g., another vehicle). The radar 410 can detect the surroundings of the vehicle 400 by sensing the presence of an object in relation to the vehicle 400.

The sensors 406 can include a LiDAR 412. In some implementations, the LiDAR 412 can include any object detection system that is based at least in part on laser light. For example, the LiDAR 412 can be oriented in any direction relative to the vehicle and can be used for detecting at least a distance to one or more other objects (e.g., another vehicle). The LiDAR 412 can detect the surroundings of the vehicle 400 by sensing the presence of an object in relation to the vehicle 400. In some implementations, the LiDAR 412 is a scanning LiDAR. In some implementations, the LiDAR 412 is a non-scanning LiDAR (e.g., a flash LiDAR).

The sensors 406 can include a camera 418. In some implementations, the camera 418 can include any image sensor whose signal(s) the vehicle 400 takes into account. For example, the camera 418 can be oriented in any direction relative to the vehicle and can be used for detecting vehicles, lanes, lane markings, curbs, and/or road signage. The camera 418 can detect the surroundings of the vehicle 400 by visually registering a circumstance in relation to the vehicle 400.

The sensors 406 can include an ultrasonic sensor 420. In some implementations, the ultrasonic sensor 420 can include any transmitter, receiver, and/or transceiver used in detecting at least the proximity of an object based on ultrasound. For example, the ultrasonic sensor 420 can be positioned at or near an outer surface of the vehicle. The ultrasonic sensor 420 can detect the surroundings of the vehicle 400 by sensing the presence of an object in relation to the vehicle 400.

Any of the sensors 406 alone, or two or more of the sensors 406 collectively, can detect, whether or not the ADAS system 402 is controlling motion of the vehicle 400, the surroundings of the vehicle 400. In some implementations, at least one of the sensors 406 can generate an output that is taken into account in deciding whether to take over control of the vehicle 400, and if so in controlling motion of the vehicle 400. For example, the output of two or more sensors can be combined. In some implementations, one or more other types of sensors can additionally or instead be included in the sensors 406.

The planning algorithm 408 can plan for the ADAS system 402 to perform one or more actions, or to not perform any action, in response to monitoring of the surroundings of the vehicle 400 and/or an input by the driver. The output of one or more of the sensors 406 can be taken into account. In some implementations, the planning algorithm 408 can perform motion planning and/or plan a trajectory for the vehicle 400.

The vehicle controls 404 can include a steering control 422. In some implementations, the ADAS system 402 and/or another driver of the vehicle 400 controls the trajectory of the vehicle 400 by adjusting a steering angle of at least one wheel by way of manipulating the steering control 422. The steering control 422 can be configured for controlling the steering angle though a mechanical connection between the steering control 422 and the adjustable wheel, or can be part of a steer-by-wire system.

The vehicle controls 404 can include a gear control 424. In some implementations, the ADAS system 402 and/or another driver of the vehicle 400 uses the gear control 424 to choose from among multiple operating modes of a vehicle (e.g., a Drive mode, a Neutral mode, or a Park mode). For example, the gear control 424 can be used to control an automatic transmission in the vehicle 400.

The vehicle controls 404 can include signal controls 426. In some implementations, the signal controls 426 can control one or more signals that the vehicle 400 can generate. For example, the signal controls 426 can control a turn signal and/or a horn of the vehicle 400.

The vehicle controls 404 can include brake controls 428. In some implementations, the brake controls 428 can control one or more types of braking systems designed to slow down the vehicle, stop the vehicle, and/or maintain the vehicle at a standstill when stopped. For example, the brake controls 428 can be actuated by the ADAS system 402. As another example, the brake controls 428 can be actuated by the driver using a brake pedal.

The vehicle controls 404 can include a vehicle dynamic system 430. In some implementations, the vehicle dynamic system 430 can control one or more functions of the vehicle 400 in addition to, or in the absence of, or in lieu of, the driver's control. For example, when the vehicle comes to a stop on a hill, the vehicle dynamic system 430 can hold the vehicle at standstill if the driver does not activate the brake control 428 (e.g., step on the brake pedal).

The vehicle controls 404 can include an acceleration control 432. In some implementations, the acceleration control 432 can control one or more types of propulsion motor of the vehicle. For example, the acceleration control 432 can control the electric motor(s) and/or the internal-combustion motor(s) of the vehicle 400.

The vehicle 400 can include a user interface 434. The user interface 434 can include an audio interface 436. In some implementations, the audio interface 436 can include one or more speakers positioned in the passenger compartment. For example, the audio interface 436 can at least in part operate together with an infotainment system in the vehicle.

The user interface 434 can include a visual interface 438. In some implementations, the visual interface 438 can include at least one display device in the passenger compartment of the vehicle 400. For example, the visual interface 438 can include a touchscreen device and/or an instrument cluster display.

Figure 5:
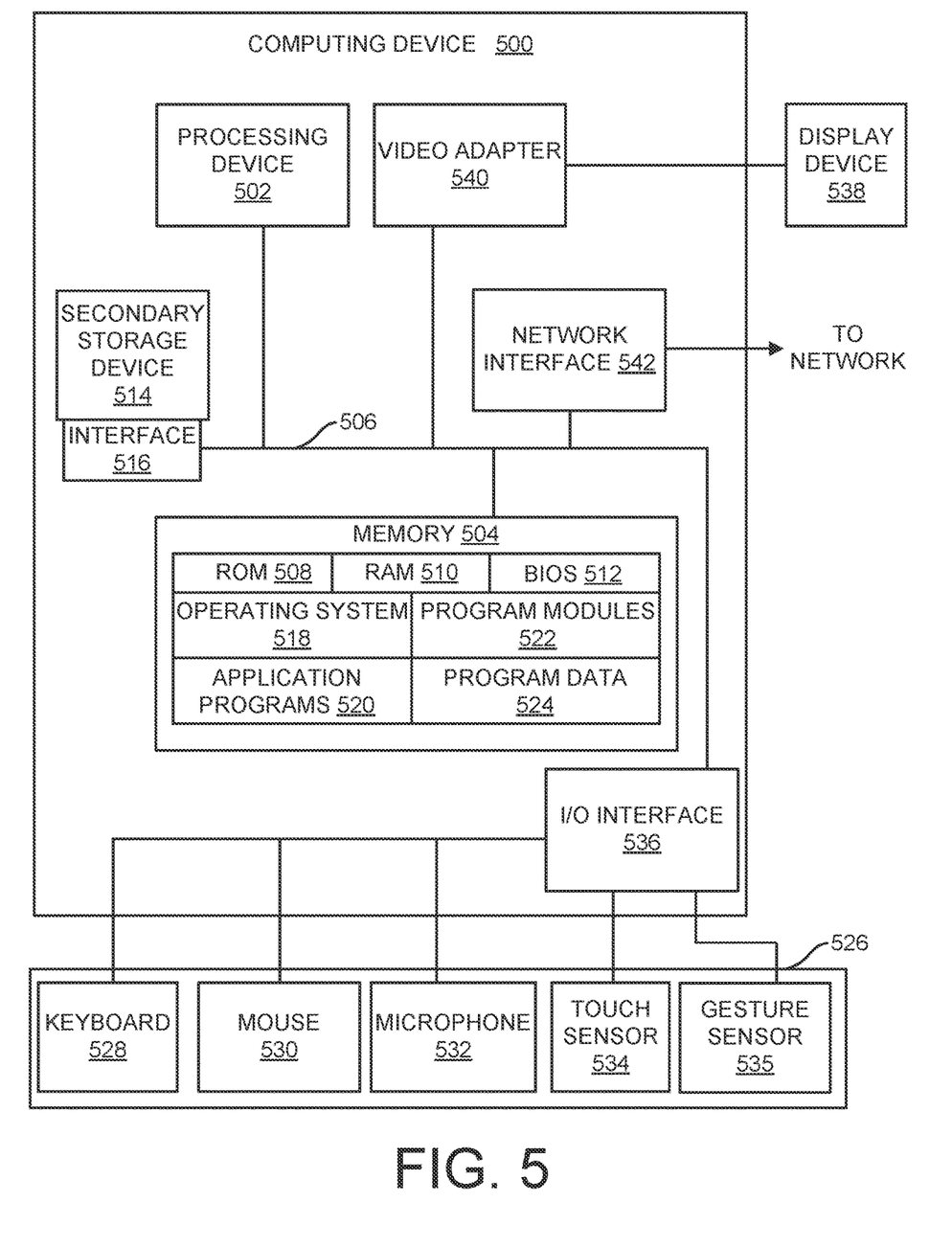
FIG. 5 illustrates an example architecture of a computing device.

FIG. 5 illustrates an example architecture of a computing device 500 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 5 can be used to execute the operating system, application programs, and/or software modules (including the software engines) described herein.

The computing device 500 includes, in some embodiments, at least one processing device 502 (e.g., a processor), such as a central processing unit (CPU). A variety of processing devices are available from a variety of manufacturers, for example, Intel or Advanced Micro Devices. In this example, the computing device 500 also includes a system memory 504, and a system bus 506 that couples various system components including the system memory 504 to the processing device 502. The system bus 506 is one of any number of types of bus structures that can be used, including, but not limited to, a memory bus, or memory controller; a peripheral bus; and a local bus using any of a variety of bus architectures.

Examples of computing devices that can be implemented using the computing device 500 include a desktop computer, a laptop computer, a tablet computer, a mobile computing device (such as a smart phone, a touchpad mobile digital device, or other mobile devices), or other devices configured to process digital instructions.

The system memory 504 includes read only memory 508 and random access memory 510. A basic input/output system 512 containing the basic routines that act to transfer information within computing device 500, such as during start up, can be stored in the read only memory 508.

The computing device 500 also includes a secondary storage device 514 in some embodiments, such as a hard disk drive, for storing digital data. The secondary storage device 514 is connected to the system bus 506 by a secondary storage interface 516. The secondary storage device 514 and its associated computer readable media provide non-volatile and non-transitory storage of computer readable instructions (including application programs and program modules), data structures, and other data for the computing device 500.

Although the example environment described herein employs a hard disk drive as a secondary storage device, other types of computer readable storage media are used in other embodiments. Examples of these other types of computer readable storage media include magnetic cassettes, flash memory cards, solid-state drives (SSD), digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 514 and/or system memory 504, including an operating system 518, one or more application programs 520, other program modules 522 (such as the software engines described herein), and program data 524. The computing device 500 can utilize any suitable operating system.

In some embodiments, a user provides inputs to the computing device 500 through one or more input devices 526. Examples of input devices 526 include a keyboard 528, mouse 530, microphone 532 (e.g., for voice and/or other audio input), touch sensor 534 (such as a touchpad or touch sensitive display), and gesture sensor 535 (e.g., for gestural input). In some implementations, the input device(s) 526 provide detection based on presence, proximity, and/or motion. Other embodiments include other input devices 526. The input devices can be connected to the processing device 502 through an input/output interface 536 that is coupled to the system bus 506. These input devices 526 can be connected by any number of input/output interfaces, such as a parallel port, serial port, game port, or a universal serial bus. Wireless communication between input devices 526 and the input/output interface 536 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 538, such as a monitor, liquid crystal display device, light-emitting diode display device, projector, or touch sensitive display device, is also connected to the system bus 506 via an interface, such as a video adapter 540. In addition to the display device 538, the computing device 500 can include various other peripheral devices (not shown), such as speakers or a printer.

The computing device 500 can be connected to one or more networks through a network interface 542. The network interface 542 can provide for wired and/or wireless communication. In some implementations, the network interface 542 can include one or more antennas for transmitting and/or receiving wireless signals. When used in a local area networking environment or a wide area networking environment (such as the Internet), the network interface 542 can include an Ethernet interface. Other possible embodiments use other communication devices. For example, some embodiments of the computing device 500 include a modem for communicating across the network.

The computing device 500 can include at least some form of computer readable media. Computer readable media includes any available media that can be accessed by the computing device 500. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 500.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 5 is also an example of programmable electronics, which may include one or more such computing devices, and when multiple computing devices are included, such computing devices can be coupled together with a suitable data communication network so as to collectively perform the various functions, methods, or operations disclosed herein.

In some implementations, the computing device 500 can be characterized as an ADAS computer. For example, the computing device 500 can include one or more components sometimes used for processing tasks that occur in the field of artificial intelligence (AI). The computing device 500 then includes sufficient proceeding power and necessary support architecture for the demands of ADAS or AI in general. For example, the processing device 502 can include a multicore architecture. As another example, the computing device 500 can include one or more co-processors in addition to, or as part of, the processing device 502. In some implementations, at least one hardware accelerator can be coupled to the system bus 506. For example, a graphics processing unit can be used. In some implementations, the computing device 500 can implement a neural network-specific hardware to handle one or more ADAS tasks.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-based method of providing braking of a vehicle at low speed, the method comprising:
   dynamically determining, while a vehicle controlled by a driver is traveling at low speed, a deceleration limit for the vehicle with regard to an obstacle, the deceleration limit determined based on at least (i) the low speed, (ii) a distance to the obstacle, and (iii) a determined jerk limit for the vehicle;
   after dynamically determining the deceleration limit, determining regions to include in a braking profile for the vehicle;
   when the regions determined do not include a constant deceleration region, again determining the deceleration limit, wherein the deceleration limit is not again determined when the regions determined do include the constant deceleration region;
   determining whether to brake the vehicle, the determination based on at least the low speed, the deceleration limit, and the distance to the obstacle; and
   in response to a determination to brake the vehicle, braking the vehicle according to the braking profile.

2. The computer-based method of claim 1, wherein the deceleration limit comprises a minimum deceleration applicable to the vehicle.

3. The computer-based method of claim 1, wherein determining the regions to include in the braking profile comprises determining whether to use a triangular braking profile.

4. The computer-based method of claim 3, wherein determining whether to use the triangular braking profile comprises choosing between the triangular braking profile and a trapezoidal braking profile.

5. The computer-based method of claim 1, wherein multiple braking profiles are determined for the vehicle, further comprising performing a choice among the braking profiles before braking the vehicle according to the braking profile.

6. The computer-based method of claim 5, wherein the choice comprises taking into account respective stopping distances of the multiple braking profiles.

7. The computer-based method of claim 1, further comprising, in response to a determination not to brake the vehicle, again dynamically determining the deceleration limit.

8. The computer-based method of claim 7, wherein again dynamically determining the deceleration limit is based on at least a change in the low speed.

9. The computer-based method of claim 1, further comprising, in response to the determination to brake the vehicle, storing the deceleration limit in a memory and terminating dynamic determination of the deceleration limit.

10. The computer-based method of claim 1, further comprising receiving, before dynamically determining the deceleration limit, a user's choice among engagement levels, wherein the jerk limit for the vehicle depends on the engagement level of the user's choice.

11. The computer-based method of claim 1, further comprising determining, for each of the regions of the braking profile, a time interval corresponding to application of braking according to the region of the braking profile.

12. The computer-based method of claim 11, further comprising using the determined time intervals in determining a stopping distance for the vehicle.

13. The computer-based method of claim 1, wherein the obstacle is detected using at least an ultrasonic sensor.

14. A non-transitory computer-readable medium including instructions that when executed cause a processor to perform operations, the operations comprising:
   dynamically determining, while a vehicle controlled by a driver is traveling at low speed, a deceleration limit for the vehicle with regard to an obstacle, the deceleration limit determined based on at least (i) the low speed, (ii) a distance to the obstacle, and (iii) a determined jerk limit for the vehicle;

after dynamically determining the deceleration limit, determining regions to include in a braking profile for the vehicle;

when the regions determined do not include a constant deceleration region, again determining the deceleration limit, wherein the deceleration limit is not again determined when the regions determined do include the constant deceleration region;

determining whether to brake the vehicle, the determination based on at least the low speed, the deceleration limit, and the distance to the obstacle; and in response to a determination to brake the vehicle, braking the vehicle according to the braking profile.

\* \* \* \* \*